United States Patent
Smith, Jr.

(10) Patent No.: US 6,733,164 B1
(45) Date of Patent: May 11, 2004

(54) LAMP APPARATUS, LAMP AND OPTICAL LENS ASSEMBLY AND LAMP HOUSING ASSEMBLY

(75) Inventor: John L. Smith, Jr., Deputy, IN (US)

(73) Assignee: Valeo Sylvania LLC, Seymour, IN (US)

( * ) Notice: Subject to any disclaimer, the term of this patent is extended or adjusted under 35 U.S.C. 154(b) by 0 days.

(21) Appl. No.: 10/277,469

(22) Filed: Oct. 22, 2002

(51) Int. Cl.[7] .................................................. F21S 8/10

(52) U.S. Cl. ........................ 362/545; 362/800; 362/237; 362/240; 362/244; 362/331; 362/364; 362/365

(58) Field of Search ................................. 362/237, 240, 362/244, 331, 545, 800

(56) References Cited

U.S. PATENT DOCUMENTS

| | | | | |
|---|---|---|---|---|
| 4,935,665 A | * | 6/1990 | Murata | ........................ 313/500 |
| 5,490,049 A | * | 2/1996 | Montalan et al. | ........... 362/240 |

* cited by examiner

Primary Examiner—Sandra O'Shea
Assistant Examiner—Mark Tsidulko
(74) Attorney, Agent, or Firm—William E. Meyer

(57) ABSTRACT

A lamp and optical lens assembly is provided having a carrier with one or more lamp assemblies mounted thereto relative to a carrier registration. An optical lens having at least one focal point and at least one guide portion relative to the focal point is also provided. The carrier is coupled to the optical lens with the registration aligned with the location guide portion so as to accurately position the lamp assembly relative to the focal point. A lamp apparatus is provided by enclosing the lamp and optical lens assembly within a housing and cover lens combination. A lamp housing assembly is also provided.

20 Claims, 8 Drawing Sheets

LAMP APPARATUS, LAMP AND OPTICAL LENS ASSEMBLY AND LAMP HOUSING ASSEMBLY

TECHNICAL FIELD

The present invention relates to an electric lamp assembly that includes an optical lens and LED carrier sub-assembly enclosed within a lamp housing by a cover lens. A lamp and optical lens assembly and lamp housing assembly are also provided.

BACKGROUND ART

There are many applications for the use of electric lamps. The particular use typically determines the structural configuration of the lamp assembly and the operational characteristics of the electric lamp. An objective of manufacturers of electric lamps is to provide an economical product that operates efficiently and has a long life. This is particularly true regarding electric lamps for use with motor vehicles. Some lamps include a number of components that must be assembled very accurately in order to obtain the desired optical characteristics. One such lamp includes a lamp housing having an optical lens therein, the housing being enclosed by a cover in the form of an outer lens. Positioning the lens within the housing requires that it be properly aligned, and this can be a costly procedure. Typically, the light source will also be contained within the lamp housing and positioned in such a manner that the light emitted by the light source is worked upon by the optical lens such as, for example, being defused or being spread. One of the concerns regarding such a lamp is the need for complicated slides, screws, clips and the like to mount the inner optical lens and light source within the lamp housing. The time and materials needed to perform this operation during lamp fabrication as well as when the light source needs to be replaced is undesirably costly.

Another concern is that in assembling an electric lamp having an inner optical lens and light source, it is necessary to accurately aim the light source relative to the optical lens. This procedure also undesirably increases the cost of the product In some applications, it is desired to use LEDs such lamps being efficient and very long lived light sources. LEDs are particularly useful in motor vehicles. However, they generally do not generate the number of lumens necessary for many tasks. As a result, they are frequently ganged together, and this complicates the manufacturing process particularly since the plurality of LEDs still need to be accurately aimed. All of the foregoing requirements can lead to difficult assembly methods that increase the final cost of the lamp assembly.

DISCLOSURE OF THE INVENTION

An object of the present invention is to provide an improved electric lamp assembly having an optical lens and light source contained within a lamp housing.

Another object of the present invention is to provide such an electric lamp assembly that obviates the disadvantages of the prior art A further object of the present invention is to provide an economical, efficient and- high quality electric lamp assembly having an inner optical lens and light source.

It is another object of the present invention to provide an electric lamp assembly having an inner optical lens and a light source accurately yet simply mounted within the lamp housing.

A further object of the present invention is to provide an electric lamp assembly wherein an optical lens having a light source readily and accurately mounted thereto may be readily and accurately mounted within a lamp housing during the manufacture thereof and also during replacement of the light source.

Another object of the present invention is to provide an improved lamp and optical lens assembly.

Yet a further object of the present invention is to provide such a lamp and optical lens assembly that obviates the disadvantages of the prior art.

Another object of the present invention is to provide an economical, efficient and high quality lamp and optical lens assembly.

A further object of the present invention is to provide an improved lamp housing assembly.

Yet a further object of the present invention is to provide such a lamp housing assembly that obviates the disadvantages of the prior art Another object of the present invention is to provide such a lamp housing assembly having an inner optical lens accurately yet simply mounted therein.

Yet a further object of the present invention is to provide a lamp and optical lens assembly which may be accurately and simply mounted;within and held in place relative to a lamp housing enclosed by an outer cover lens.

A lamp housing assembly is provided comprising a housing, an optical lens and a cover lens. The housing includes a formed recess. The optical lens includes at least one focal point and a portion structured and arranged to mate with the formed recess. The cover lens is sealable to the housing and is structured and arranged to trap and hold in place the portion in the formed recess and between the housing and the cover lens.

BRIEF DESCRIPTION OF THE DRAWINGS

This invention may be clearly understood by reference to the attached drawings in which like reference numerals designate like parts and in which.

DESCRIPTION OF THE PREFERRED EMBODIMENT

For a better understanding of the present invention, together with other and further objects, advantages and capabilities thereof, reference is made to the following disclosure and appended claims taken in conjunction with the above-described drawings.

Figure 1:
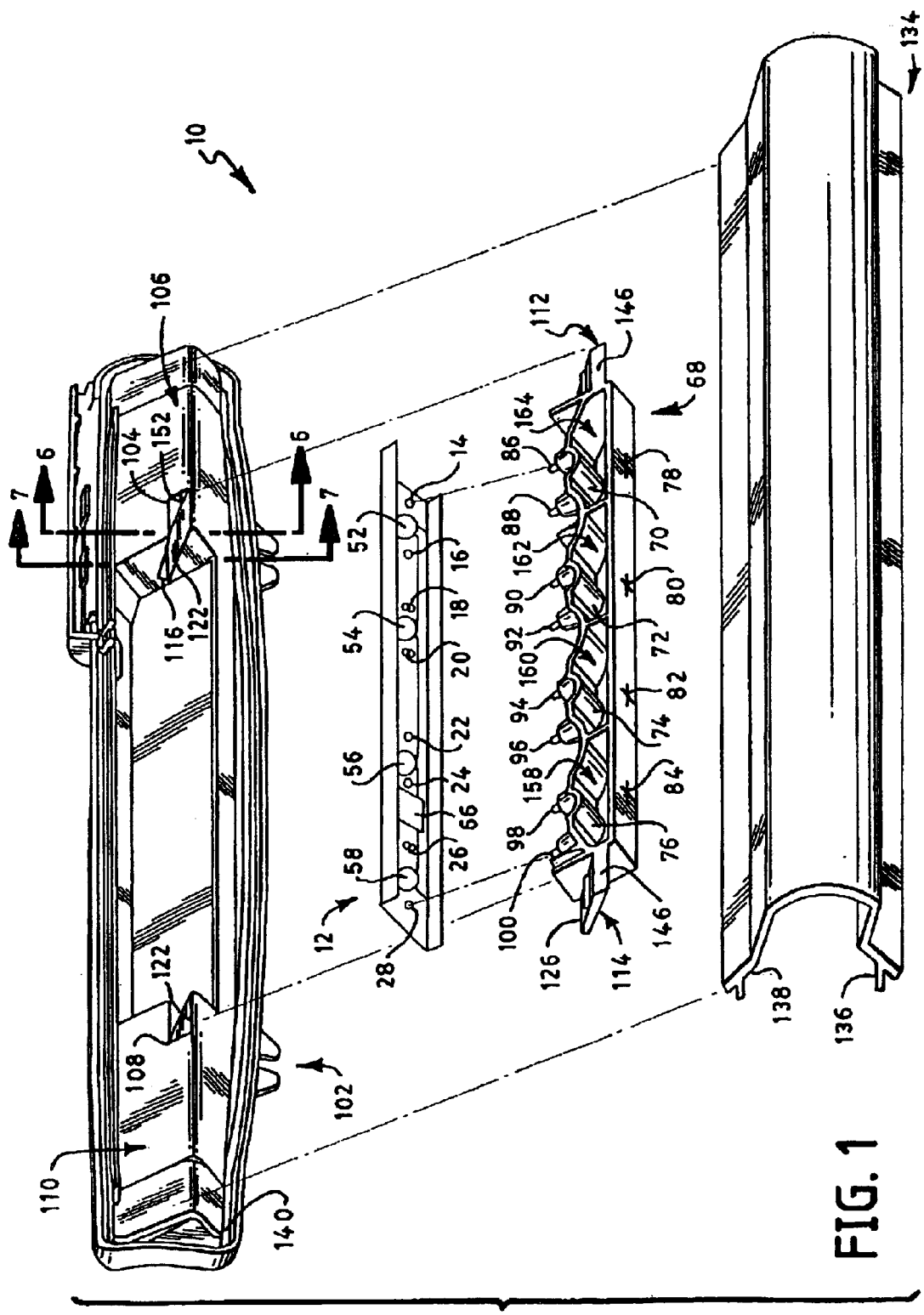
FIG. 1 is an exploded view of one embodiment of a lamp apparatus of the present invention, partially cut away.
Figure 2:
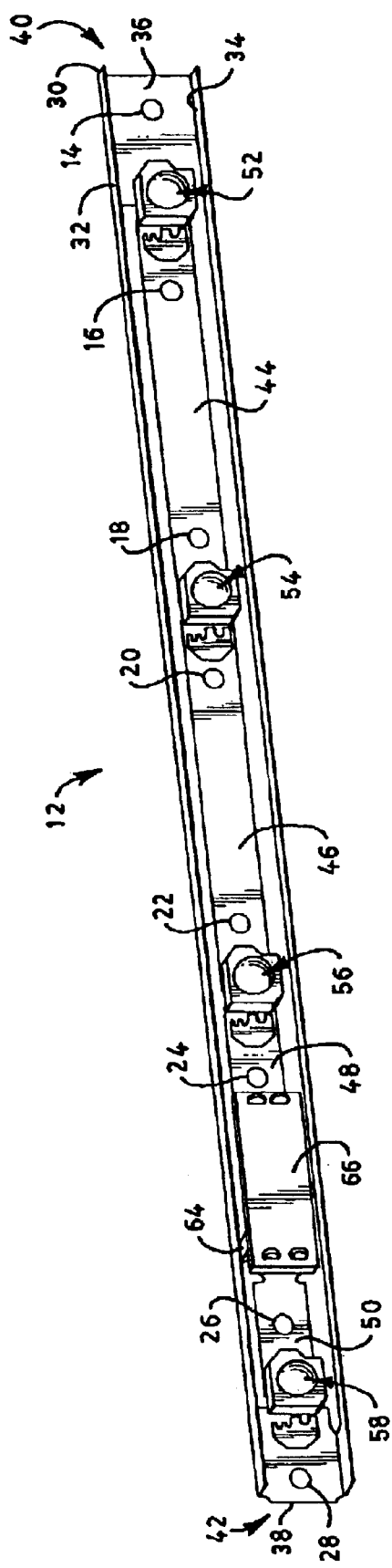
FIG. 2 is a front view of the carrier with lamp assemblies mounted thereto illustrated in the embodiment of FIG. 1.
Figure 3:
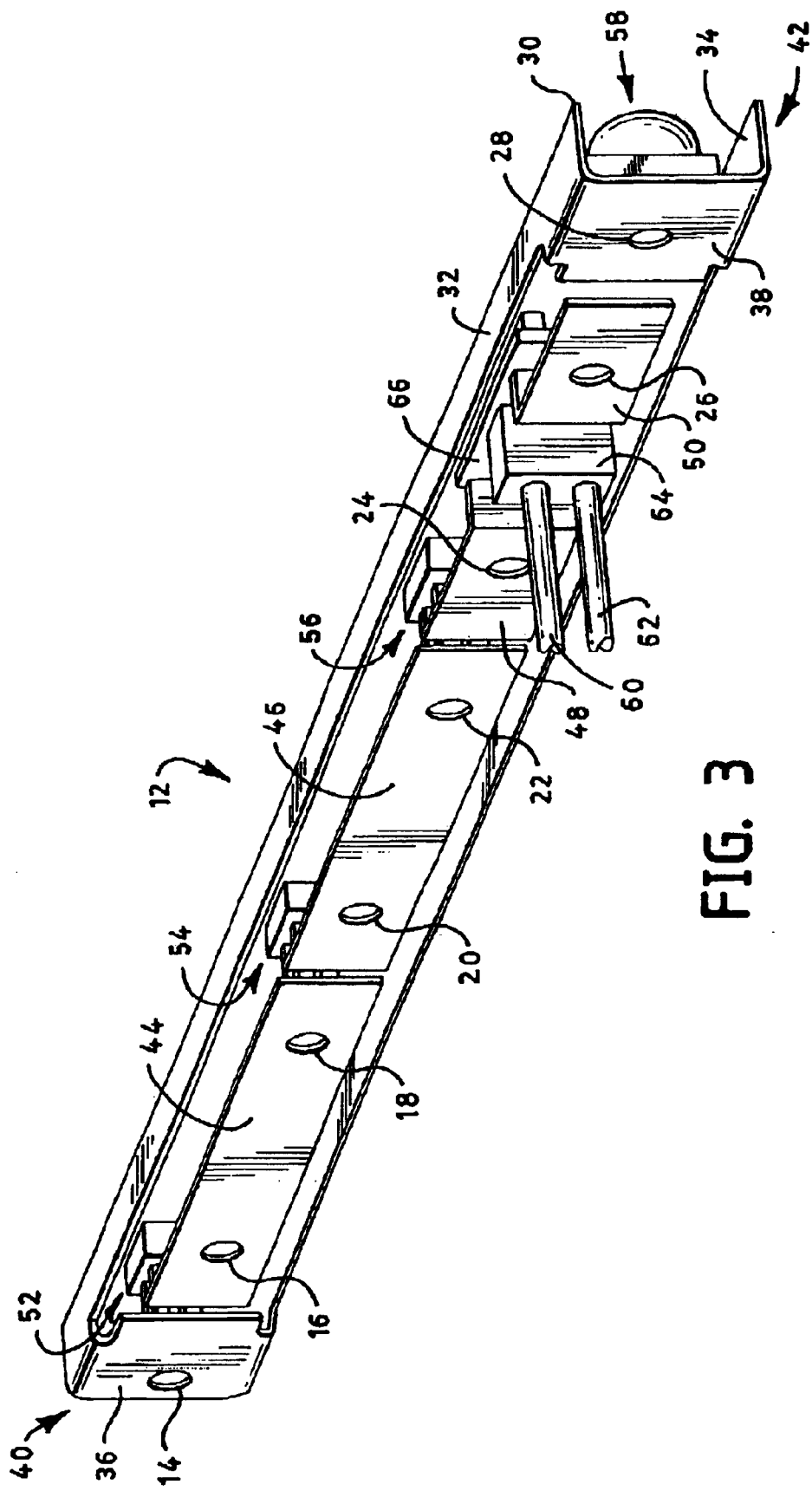
FIG. 3 is a rear view of FIG. 2.

FIG. 1 illustrates one embodiment of the present invention In the present invention, a lamp apparatus is provided which includes a carrier having a registration. Without limitation, a carrier may be provided having a registration in the form of at least two registration holes. For example, in FIG. 1, the lamp apparatus 10 of the present invention comprises an elongated metal carrier 12 having a plurality of registration holes, in this embodiment eight registration holes 14, 16, 18, 20, 22, 24, 26 and 28 being provided. With reference to FIGS. 2 and 3, the elongated metal carrier 12 is in the form of a metal channel member 30 having legs 32 and 34 extending between base segments 36 and 38 at opposite ends 40 and 42 of the carrier. Intermediate base segments 44, 46, 48 and 50 are ganged together between base segments 36 and 38, the base segments supporting respective lamp assemblies, as described hereinafter.

In the present invention, at least one lamp assembly is mounted on the carrier relative to the registration. In FIGS. 1 to 3, the lamp apparatus 10 comprises a plurality of lamp assemblies in the form of LED assemblies 52, 54, 56 and 58 mounted along carrier 12, each LED assembly being positioned relative to at least a respective two registration holes. In particular LED assemblies 52, 54, 56 and 58 are mounted along carrier 12, each being positioned between a respective pair of registration holes 14, 16 and 18, 20 and 22, 24 and 26, 28. With reference to FIG. 3, conductors 60 and 62 are electrically and mechanically connected to a connector 64, which is electrically and mechanically connected to a mating connector 66. Connector 66 is electrically and mechanically connected to the LED assemblies 52, 54, 56 and 58, in a conventional manner. To this end, LED assemblies 52, 54, 56 and 58 are electrically and mechanically connected between respective pairs of base segments 36, 44 and 44 and 46 and 46 and 48 and 50 and 38. The connector 66 is electrically and mechanically connected between base segments 48 and 50 to provide the electricity to the LED assemblies 52, 54, 56 and 58 in a conventional manner.

Figure 4:
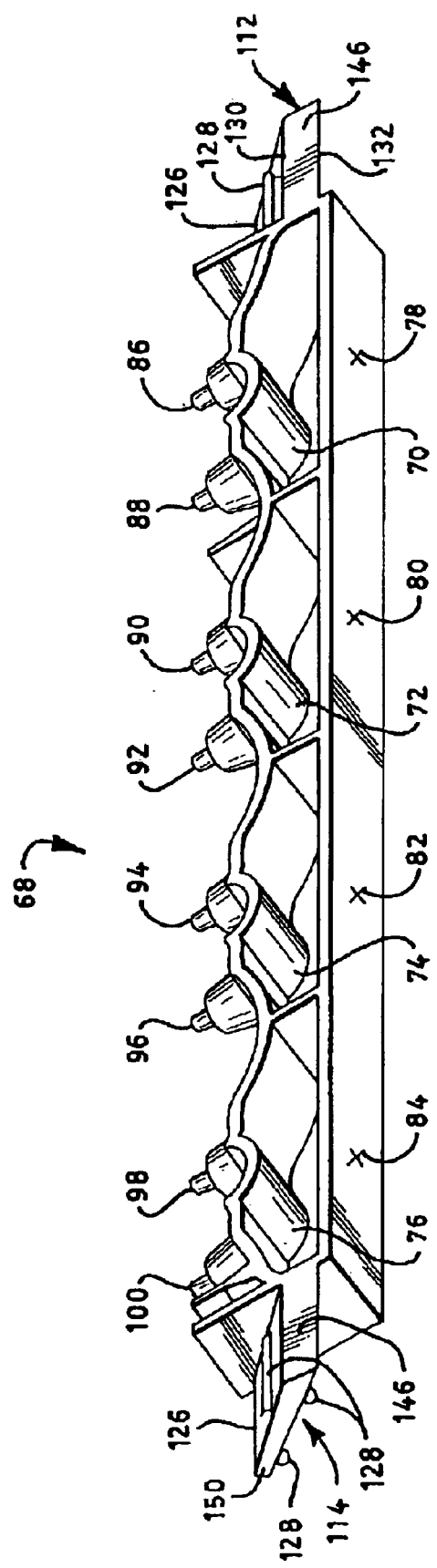
FIG. 4 is a view of the inner optical lens of the embodiment illustrated in FIG. 1.
Figure 5:
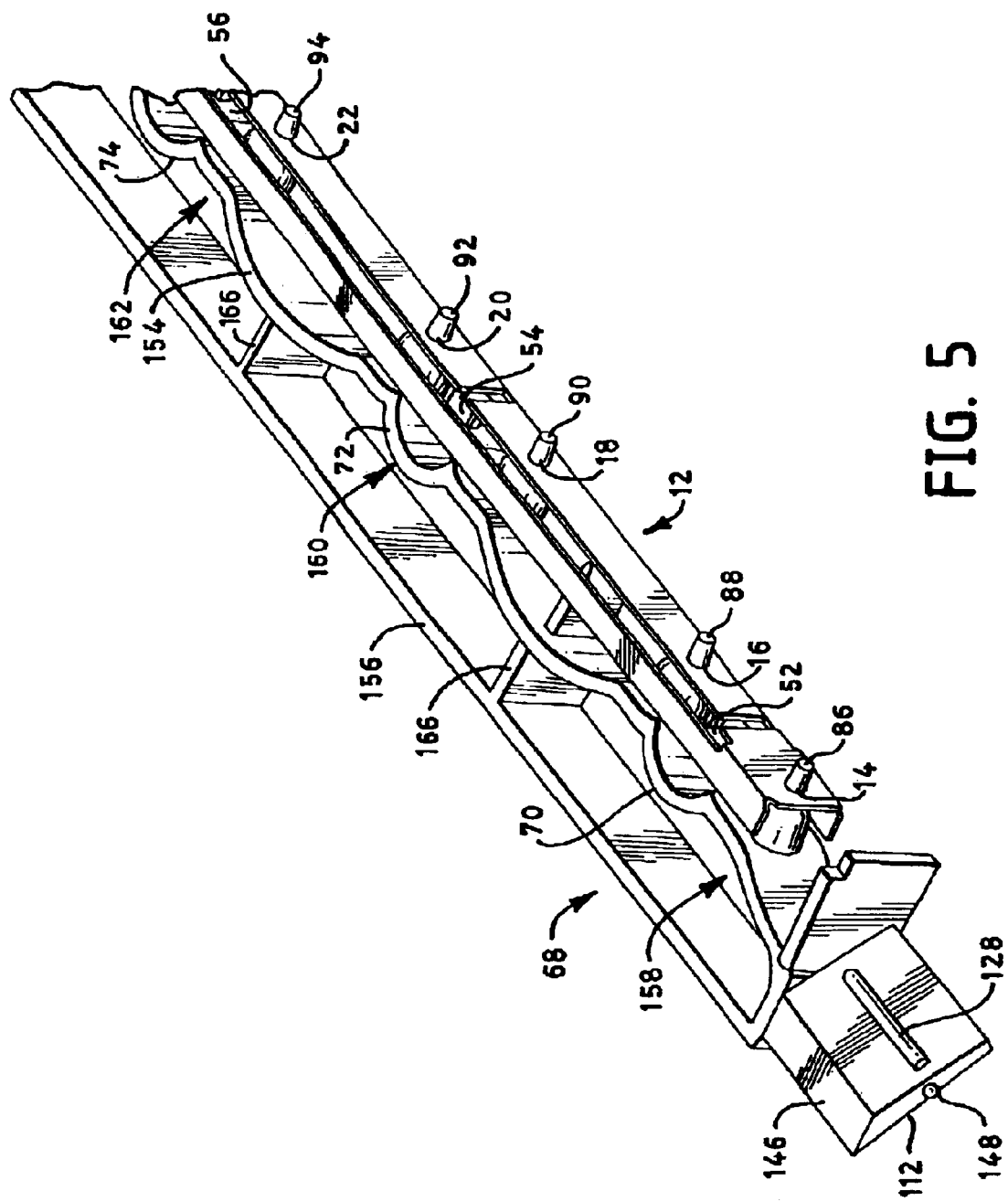
FIG. 5 is a partial view of one embodiment of a lamp and optical lens assembly of the present invention.

In the present invention, an inner optical lens is provided having at least one focal point and at least one location guide relative to the focal point. The carrier is coupled to the optical lens with the registration aligned with the location guide, thereby accurately positioning the lamp assembly relative to the focal point Without limitation, an optical lens may be provided having at least one focal point and at least one location guide in the form of at least two location guide pins located relative to the focal point. In such an embodiment, the registration will be in the form of two registration holes in the carrier, and the carrier will be coupled to the optical lens by positioning the location guide pins in respective registration holes, thereby positioning the lamp assembly relative to the focal point. For example, in FIG. 1, the lamp apparatus 10 comprises a molded optical lens 68, details of which are illustrated in FIG. 4. Optical lens 68 includes a plurality of portions 70, 72, 74 and 76, each having a respective focal point 78, 80, 82 and 84. Each portion 70, 72, 74 and 76 has at least two respective guide pins 86, 88 and 90, 92 and 94, 96 and 98, 100 relative to a respective focal point 78, 80, 82 and 84. The carrier 12 is coupled to the optical lens 68, to provide a lamp and optical lens assembly as illustrated in. FIG. 5, by inserting guide pins 86, 88, 90, 92, 94, 96, 98 and 100 into respective registration holes 14, 16, 18, 20, 22, 24, 26 and 28, thereby positioning the LED assemblies 52, 54, 56 and 58, mounted to the carrier 12, relative to respective portions 70, 72, 74 and 76 and respective focal points 78, 80, 82 and 84 of the optical lens 68. The guide pins may be force fit into the registration holes or otherwise held in place therein by an adhesive or any other manner, thereby enabling accurate location of the LED assemblies with respect to the lens optics provided by the optical lens 68 and providing the lamp and optical lens assembly illustrated in FIG. 5 which may be easily insertable and removable relative to a lamp housing as described hereinafter.

Figure 6:
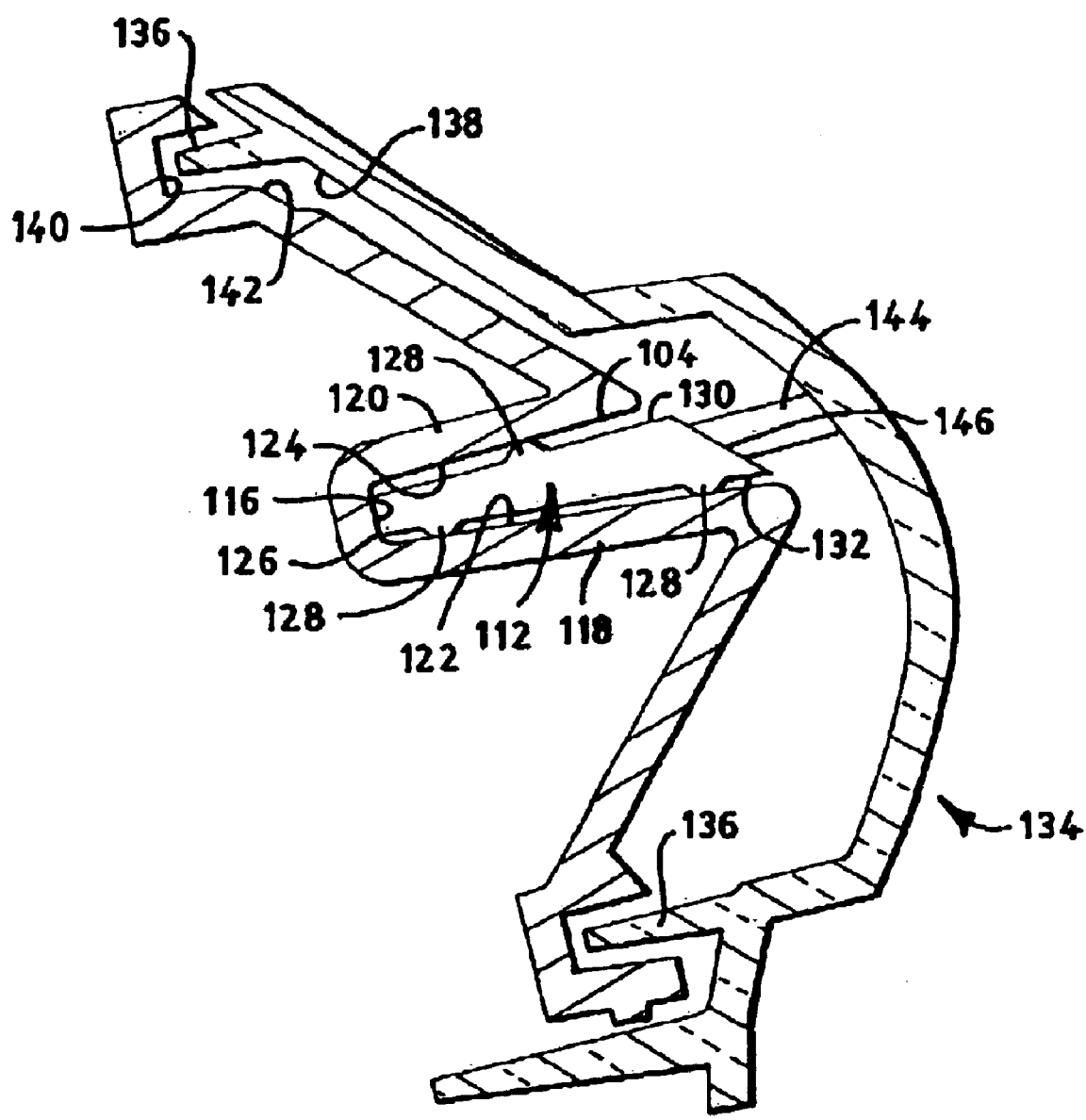
FIG. 6 is a sectional view of FIG. 1 taken along lines 6—6.

In the present invention, a housing and an outer cover lens are provided which enclose the lamp and optical lens assembly formed by the carrier and inner optical lens. In one embodiment, the housing may have a formed recess that is structured and arranged to mate with a portion of the inner optical lens, and a cover lens sealed to the housing therby trapping the portion of the inner optical lens in the formed recess and between the housing and the cover lens. For example, in the embodiment illustrated in FIG. 1, a housing 102 is, provided having a formed recess 104 at end segment 106 of the housing and a formed recess 108 at an opposite end segment 110 of the housing. Recesses 104 and 108 are wedge shaped as best illustrated in FIG. 6 that illustrates recess 104. Optical lens 68 includes opposite end portions each of which mate with a respective recess 104 and 108. In particular, in the embodiment of FIGS. 1, 4 and 6, the end portions are in the form of noting wedge shaped end tabs 112 and 114 extending from opposite ends of the body portion of the optical lens 68. Each recess 104 and 108 is in the form of a wedge shaped slot provided within the body portion of the housing 102. Referring to FIG. 6, each slot includes a base 116 from which extends legs 118 and 120 having opposing surfaces 122 and 124. The base 116 and surfaces 122, 124 provide housing locating surfaces for the optical lens 68 to engage as described herein. Each tab 112, 114 is inserted into a respective recess 104, 108 until each base 126 of tabs 112, 114 engages a base 116 of a respective recess. In this manner, each of tabs 112, 114 securely mates with a respective recess 104, 108 to hold the optical lens 68 in place relative to the housing 102. Frictional engagement between the optical lens 68 and housing 102 is facilitated by providing the tabs 112, 114 with compressible pads that engage adjacent surfaces of the recesses 104, 108. For example, at least one pad may be provided in the form of a thin rib molded into each tab and extending outward from a tab surface. In the embodiment of FIGS. 1, 4 and 6, a plurality of tabs 1,28 extend outwardly from surfaces 130 and 132. The ribs 128 provide frictional engagement with respective surfaces 122 and 124 as each tab 112, 114 is pressed into a respective recess 104, 108, and the ribs engage and are thereby caused to deform by respective surfaces 122 and 124. As a result no screws or similar hardware, and similarly no cosmetically difficult glue is needed to secure the optical lens 68 in place.

Figure 7:
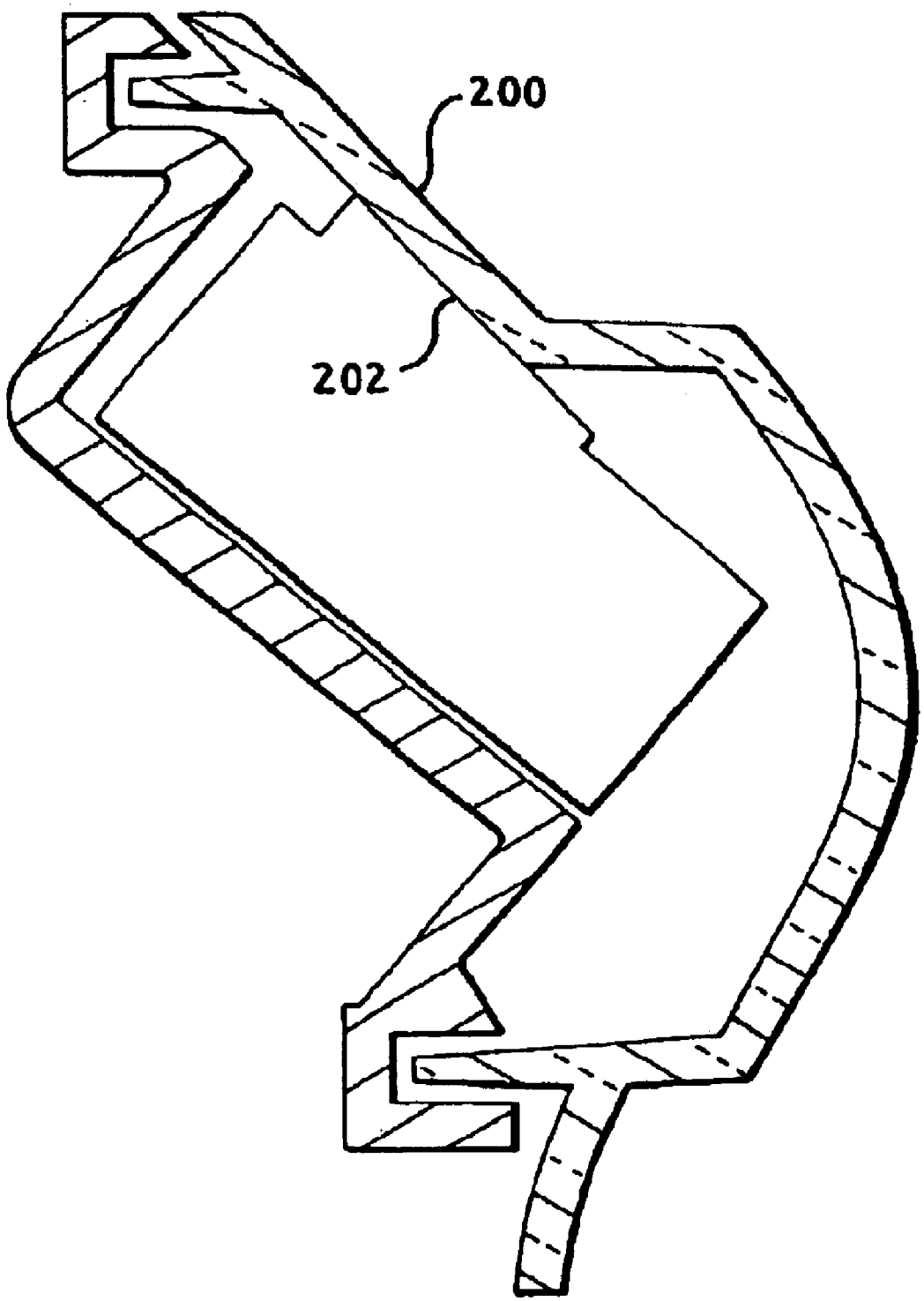
FIG. 7 is a sectional view of FIG. 1 taken along lines 7—7.

In the embodiment illustrated in FIGS. 1 and 6, a cover lens 134 is provided which is sealed to the housing 102 in a conventional manner. The axial ends of cover lens 134 have been cut away. The preferred embodiment of cover lens 134 includes rounded ends to circumferentially close cover housing 102 with cover lens 134. The cover lens 134 includes one or more protrusion 136 that extends around a peripheral portion of an inner surface 138 of the cover lens. The housing 102 includes a channel 140, which extends around a peripheral portion of an inner surface 142 of the housing. The protrusion 136 and channel 140 are structured and arranged such that the protrusion may be inserted into the channel to attach and seal the cover lens 134 to the housing 102, when assembling the lamp apparatus 10, in a conventional manner. When assembled in this manner, the tabs 112 are frictionally trapped in the slots, and the cover lens 134 further holds the optical lens 68 in position relative to the housing 102 by blocking the tabs 112 and 114 in respective recesses 104 and 108 and between the housing 102 and the cover lens 134. To this end, as illustrated in FIG. 6, the cover lens 134 may contact a portion of the optical lens 68, for example with at least one projection 144 which extends from the inner surface 138 of the cover lens. In a more preferred embodiment, an unseen (during normal use) edge portion 200 of the cover lens contacts a similarly unseen shoulder portion 202 of the optical lens, for example the end wall supporting tab 112, which then also blocks tab 112 in the recess 104. FIG. 7 is a sectional view of FIG. 1 taken along lines 7—7 showing the contact between edge portion 200 and shoulder portion 202. The optical lens 68, the housing 102 and the cover lens 134 are structured and arranged in such a manner that when the tabs 112, 114 are fully inserted into respective recesses 104, 108, and the protrusion 136 is fully inserted into the channel 140, each projection 144 will engage an end surface 146, which is opposite the base 126, of a respective tab 112 and 114 to urge each base 126 against a base 116 of a respective recess 104, 108. Or alternatively, the optical lens 68, the housing 102 and the cover lens 134 are structured and arranged in such a manner that when the tabs 112, 114 are fully inserted into respective recesses 104, 108, and the protrusion 136 is fully inserted into the channel 140, shoulder edge portion 200 will engage a shoulder portion 202 to urge each base 126 against abase 116 of a respective recess 104, 108. No molded projection 144 is necessary in this second embodiment.

When the lamp is fully assembled, the engagement of each rib 128 with a respective opposing surfaces 122 and 124 accurately locates the optical lens 68 in a fore and an aft direction relative to the lamp apparatus 10. Further, the engagement of each base 126 of tabs 112, 114 with a base 116 of a respective recess 104, 108 serves to accurately locate the optical lens 68 in an up and down direction relative to the lamp apparatus 10. In order-to assure that the optical lens is accurately located in a lateral or widthwise direction relative to the lamp apparatus, one or both tabs 112, 114 may be provided with a protrusion in the form of a bump which is structured and arranged to engage a side wall of a respective recess 104, 108. In the embodiment illustrated in FIGS. 1 and 4, a single bump 148 is provided at an end surface 150 of tab 114 for engagement with a side wall 152 of recess 108. In view of all of the foregoing, when the lamp apparatus is fully assembled, the lamp and optical lens assembly of FIG. 5 formed by the inner optical lens with lamp assembly attached thereto is accurately positioned within the lamp housing without the use of screws or other secondary mounting hardware.

Without limitation, the present invention is useful with a tail lamp, a center high mounted stop light (CHMSL) and the like. The function, and therefore specific characteristics of, the optical lens will be determined by the nature of the lamp assembly with which it is associated. For example, the lamp assembly illustrated in FIG. 1 is a CHMSL that incorporates the present invention. The optical lens may include a first wall and a second wall spaced apart from the first wall thereby defining at least one cavity between the first and second walls. Each wall may provide a specific optical function, as desired. For example, in the embodiment illustrated in FIGS. 1 and 5, the optical lens 68 includes a first wall 154 and a second wall 156 having a plurality of cavities 158, 160, 162 and 164 therebetween separated by walls 166. Each LED assembly 52, 54, 56 and 58 is associated with a respective cavity 158, 160, 162 and 164. In the CHMSL embodiment illustrated in FIGS. 1 and 5, the optical function which the first wall 154 performs is to spread the light from each LED assembly 52, 54, 56 and 58 in a conventional manner. In particular, each segment of wall 154 is associated with a respective cavity 158, 160, 162 and 164 and serves to spread the light from a respective adjacent LED assembly 52, 54, 56 and 58. The optical function, which the wall 156 performs, is to diffuse the light emitted through the wall 154 in a conventional manner. Without limitation, in the CHMSL embodiment, the optical lens 68 is fabricated from a clear plastic material, although in other embodiments it could be molded from colored plastic such as, for example, red plastic.

Figure 8:
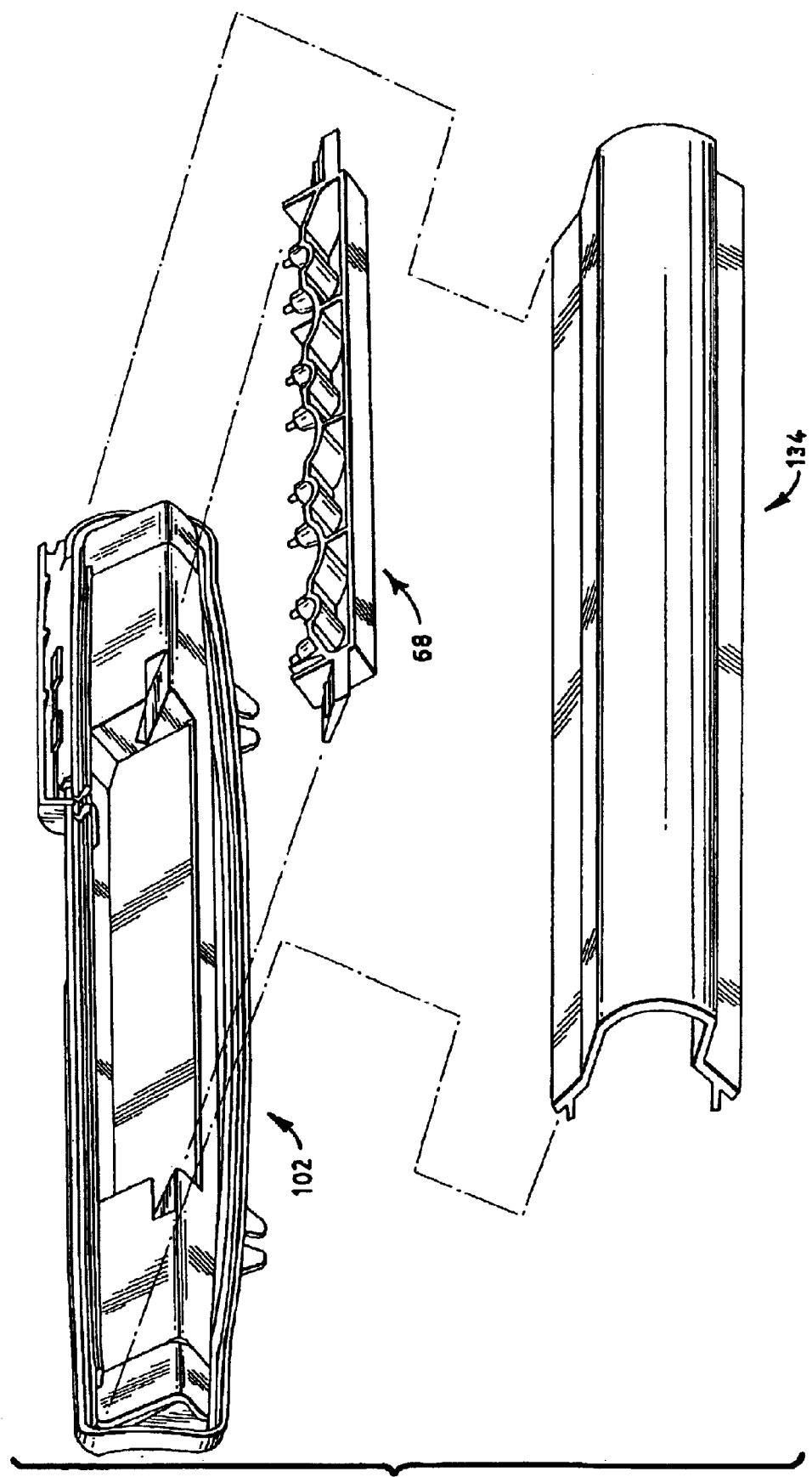
FIG. 8 is an exploded view of one embodiment of a housing assembly of the present invention, partially cut away.

The present invention provides a lamp housing assembly formed by an inner lens, a housing and an outer lens. Such lamp housing assembly is useful with any lamp apparatus where it is desired to attach an inner optical lens within a lamp housing and secure the inner optical lens in place by an outer optical lens attached to the inner optical lens. For example, FIG. 8 illustrates a lamp housing assembly 168 formed by the optical lens 68, the housing 102 and the outer lens 134.

The particular materials used in the fabrication of the components of the present invention may vary as desired. In the embodiment illustrated in the drawings, the optical lens, cover lens and lamp housing may be molded in a conventional manner from a plastic material. Polycarbonate is an example of a plastic material useful in fabricating the cover lens, inner optical lens and housing, although other plastic materials may be used. Without limitation, in the embodiment illustrated in the drawings, the inner lens is clear, and the cover lens and LEDs are red. The carrier may be stamped from sheet metal such as, for example, tinned copper. If desired, the carrier could be formed from a printed circuit board. The LEDs illustrated in the drawings are conventional LEDs clinched to the carrier in a conventional manner and may be wave soldered thereto.

The embodiments, which have been described herein, are but some of several which utilize this invention and are set forth here by way of illustration but not of limitation. It is apparent that many other embodiments, which will be readily apparent to those skilled in the art, may be made without departing materially from the spirit and scope of this invention.

I claim:

1. A lamp apparatus comprising:
   at least one lamp assembly;
   a molded optical lens having at least one focal point, the lamp assembly being mounted to said optical lens relative to said focal point;
   a molded housing having a formed recess structured and arranged to mate with a molded portion of said optical lens, said optical lens portion extending into said formed recess; and
   a cover lens sealed to said housing trapping (a) said optical lens portion in said formed recess and (b) said optical lens between said housing and said cover lens.

2. The lamp apparatus in claim 1, wherein the optical lens portion is an axially extending tab.

3. The lamp apparatus in claim 1, wherein the recess is a slot.

4. The lamp apparatus in claim 3, wherein the slot has an open end and the cover lens closes the open end of the slot.

5. The lamp assembly in claim 1, wherein the lamp assembly is mounted on a carrier and said carrier is mounted to said optical lens.

6. The lamp assembly in claim 1, wherein the lamp assembly includes an LED light source.

7. The lamp apparatus of claim 1, wherein said portion comprises at least one rib, and said formed recess comprises at least one wall surface, said portion engaging said one wall surface, and said portion and said one wall surface being structured and arranged (a) to provide frictional engagement between said housing and said optical lens and (b) to accurately locate said optical lens in a lamp apparatus fore direction and a lamp apparatus aft direction.

8. The lamp apparatus of claim 7 wherein said portion comprises a first base and said recess comprises a second base, said first base engaging said second base and being structured and arranged to accurately locate said optical lens in a lamp apparatus up direction and a lamp apparatus down direction.

9. The lamp apparatus of claim 8, wherein said portion comprises at least one bump and said formed recess comprises at least one other wall surface, said one bump engages said other wall surface, and said one bump and said other wall surface being structured and arranged to accurately locate said optical lens in a lamp apparatus widthwise direction.

10. A lamp apparatus comprising:
   an elongated metal carrier having a plurality of registration holes;
   a plurality of LED assemblies mounted along said carrier, each LED assembly positioned relative to at least a respective two registration holes;
   a molded optical lens having a plurality of segments, each segment having a respective focal point, and at least two location guide pins relative to each respective focal point, said carrier being coupled to said optical lens with each location guide pin positioned in a respective registration hole, thereby accurately positioning each LED assembly relative to a respective segment of said plurality of segments and a respective focal point;
   a housing having a formed recess structured and arranged to mate with at least one tab of said optical lens, said tab extending into said formed recess; and
   a cover lens sealed to said housing trapping said tab in the formed recess and between the housing and the cover lens.

11. A lamp apparatus comprising:
   an elongated metal carrier having a plurality of registration holes;
   a plurality of LED assemblies mounted along said carrier, each LED assembly positioned relative to at least a respective two registration holes;
   a molded optical lens having a plurality of segments, each segment having a respective focal point, and at least two location guide pins relative to each respective focal point, said carrier being coupled to said optical lens with each location guide pin positioned in a respective registration hole, thereby accurately positioning each LED assembly relative to a respective segment of said plurality of segments and a respective focal point;
   a housing having a formed recess structured and arranged to mate with at least one tab of said optical lens, said tab extending into said formed recess; and
   a cover lens sealed to said housing trapping said tab in the formed recess and between the housing and the cover lens
   wherein said cover lens comprises a projection which extends from an inner surface of said cover lens, said projection engaging a surface of said tab to trap said tab in said forced recess.

12. The lamp apparatus in claim 11, wherein each tab comprises at least one rib engaging a first surface of a respective recess.

13. The lamp apparatus in claim 12 wherein each tab comprises a tab base and each formed recess comprises a recess base, said tab base engaging said recess base.

14. The lamp apparatus of claim 13 wherein at least one tab comprises a bump engaging a second surface of a respective recess.

15. The lamp apparatus of claim 13 wherein:
   the carrier includes a registration;
   at least one said lamp assembly is mounted on said carrier relative to said registration; and
   said optical lens has at least one focal point and at least one location guide relative to said focal point, said carrier being coupled to said optical lens with said registration aligned with said location guide, thereby accurately positioning said lamp assembly relative to said focal point.

16. The lamp and optical lens assembly in claim 15 wherein said carrier comprises at least two registration holes, and further wherein said optical lens comprises at least one focal point and at least two location guide pins relative to said one focal point, said carrier being coupled to said optical lens with said location guide pins positioned in respective of said registration holes, thereby positioning said lamp assembly relative to said focal point.

17. The lamp apparatus of claim 13 wherein:
   said elongated metal carrier has a plurality of registration holes;
   said lamp includes a plurality of LED assemblies mounted along said carrier, with each LED assembly positioned relative to at least a respective two registration holes, and
   said molded optical lens has a plurality of portions each with a respective focal point and at least two location guide pins relative to each respective focal point, said carrier being coupled to the said optical lens with said location guide pins positioned in respective registration holes, thereby accurately positioning each LED assembly relative to a respective focal point.

18. A lamp housing assembly comprising:
   a housing having a formed recess;
   an optical lens having at least one focal point and having a portion structured and arranged to mate with said formed recess; and
   a cover lens scalable to the housing and structured and arranged to trap and hold in place said portion in said formed recess and between said housing and said cover lens.

19. The lamp housing assembly in claim 18 wherein said optical lens comprises at least one location guide relative to said focal point, said location guide being structured and arranged to be coupled to a carrier, having a registration, such that said registration is aligned with said location guide to position a lamp assembly mounted on said carrier relative to said focal point.

20. A lamp housing assembly comprising:
   a housing having a formed recess;
   an optical lens having at least one focal point and having a portion structured and arranged to mate with said formed recess; and
   a cover lens sealable to the housing and structured and arranged to trap and hold in place said portion in said formed recess and between said housing and said cover lens;

wherein said optical lens comprises at least one location guide relative to said focal point, said location guide being structured and arranged to be coupled to a carrier, having a registration, such that said registration is aligned with said location guide to position a lamp assembly mounted on said carrier relative to said focal point, and wherein said cover lens comprises a projection which extends from an inner surface of said cover lens, said projection structured and arranged to engage said portion to trap said portion in said formed recess.

\* \* \* \* \*